(12) United States Patent
Rabaut et al.

(10) Patent No.: US 11,919,747 B2
(45) Date of Patent: Mar. 5, 2024

(54) HOISTING BLOCK FOR A CRANE

(71) Applicant: DEME Offshore BE NV, Zwijndrecht (BE)

(72) Inventors: Dieter Wim Jan Rabaut, Ghent (BE); Kenneth Gerard Vannieuwenhuyse, Sint-Amandsberg (BE); Jan Maria Koen Michielsen, Antwerp (BE)

(73) Assignee: DEME Offshore BE NV, Zwijndrecht (BE)

( * ) Notice: Subject to any disclaimer, the term of this patent is extended or adjusted under 35 U.S.C. 154(b) by 619 days.

(21) Appl. No.: 17/263,198

(22) PCT Filed: Jul. 18, 2019

(86) PCT No.: PCT/EP2019/069385
§ 371 (c)(1),
(2) Date: Jan. 26, 2021

(87) PCT Pub. No.: WO2020/020744
PCT Pub. Date: Jan. 30, 2020

(65) Prior Publication Data
US 2021/0139290 A1    May 13, 2021

(30) Foreign Application Priority Data

Jul. 27, 2018  (BE) .................................. 2018/5544

(51) Int. Cl.
*B66C 1/36* (2006.01)
*B66D 3/06* (2006.01)
*F03D 13/10* (2016.01)

(52) U.S. Cl.
CPC ................. *B66C 1/36* (2013.01); *B66D 3/06* (2013.01); *F03D 13/10* (2016.05); *F05B 2230/61* (2013.01)

(58) Field of Classification Search
CPC .. B66C 1/36; B66C 23/52; B66D 3/06; F03D 13/10
USPC ....................................... 294/82.11
See application file for complete search history.

(56) References Cited

U.S. PATENT DOCUMENTS

| 4,174,188 A | * | 11/1979 | Brun | ....................... B66C 13/02 |
| | | | | 414/803 |
| 4,721,286 A | * | 1/1988 | Hey | .......................... B66C 1/34 |
| | | | | 254/401 |
| 5,476,247 A | * | 12/1995 | Melder | .................... B66D 3/06 |
| | | | | 254/404 |

(Continued)

FOREIGN PATENT DOCUMENTS

| DE | 202010003269 U1 | 8/2011 |
| JP | S5320776 U | 2/1978 |
| WO | 2014025253 A1 | 2/2014 |

*Primary Examiner* — Paul T Chin
(74) *Attorney, Agent, or Firm* — The Webb Law Firm

(57) ABSTRACT

Described herein is a hoisting block for a crane. The hoisting block includes an engaging element such as a load hook, to which a lifting tool such as a sling or a hoisting frame can be coupled. The hoisting block is provided with winches, outgoing winch cables of which are configured to carry the lifting tool to the engaging element and couple it to the engaging element. Also described herein is a crane provided with the hoisting block. The hoisting block can be applied for carrying a lifting tool to an engaging element and coupling it to the load-bearing means, or for stabilizing an engaging element relative to a support structure.

20 Claims, 4 Drawing Sheets

(56) References Cited

U.S. PATENT DOCUMENTS

| | | | | |
|---|---|---|---|---|
| 6,991,275 B2 * | 1/2006 | Zollondz | ................... | B66C 1/34 |
| | | | | 294/82.15 |
| 7,469,882 B2 * | 12/2008 | Frommelt | ................. | B66C 1/34 |
| | | | | 294/82.11 |
| 9,809,429 B2 * | 11/2017 | Roodenburg | ........... | B66C 23/64 |
| 10,544,015 B1 * | 1/2020 | Van Loon | ............... | B63B 27/30 |
| 2005/0274936 A1 * | 12/2005 | Lutter | ...................... | B66D 3/08 |
| | | | | 254/398 |
| 2022/0041409 A1 * | 2/2022 | Hooftman | ................. | F16B 2/06 |

* cited by examiner

HOISTING BLOCK FOR A CRANE

CROSS-REFERENCE TO RELATED APPLICATIONS

This application is the United States national phase of International Application No. PCT/EP2019/069385 filed Jul. 18, 2019, and claims priority to Belgian Patent Application No. 2018/5544 filed Jul. 27, 2018, the disclosures of which are hereby incorporated by reference in their entirety.

BACKGROUND OF THE INVENTION

Field of the Invention

The invention relates to a hoisting block for a crane, comprising an engaging element such as a load hook, to which a lifting tool such as a sling or a hoisting frame can be coupled. The invention likewise relates to a crane provided with the hoisting block, and methods wherein the hoisting block is applied.

Description of Related Art

The invention will be elucidated with reference to the placing of an offshore wind turbine. This reference however does not however imply that the invention is limited thereto, and the hoisting block can be applied equally well for lifting and placing any other structure. It is thus for instance possible to apply the invention in the context of hoisting components for other offshore foundation structures such as jetties, radar and other towers, and also for onshore applications.

When placing a component of a wind turbine, such as a foundation pile, on an underwater bottom, the foundation pile is taken up from a vessel with a lifting crane and lowered onto or into the underwater bottom, after which the foundation pile is uncoupled from the lifting crane. For the purpose of taking up such a foundation pile a lifting tool, such as for instance a sling or a hoisting frame, is attached to the foundation pile. Before lifting, this lifting tool, which is generally still situated on a support structure, for instance a work deck of a vessel, must be coupled to the hoisting block, and more particularly to an engaging element, such as a load hook or the like, which is attached to the hoisting block.

Coupling of the lifting tool to the engaging element is generally not simple, particularly not when the foundation pile or other structure has to be placed offshore. It is important here to consider that the work deck and a lifting crane present on the work deck are subject to strong rocking motions due to the effect of waves and wind force. It is hereby often difficult to keep control of a hoisting block. The dimensions of the components to be lifted and installed are further so heavy and large that the lifting tool can no longer be coupled to the load hook manually. There is therefore a need for supporting sling hoists, auxiliary cranes, forklifts or similar auxiliary devices for arranging the lifting tool, such as a sling, in the load hook. The space available on a work deck of such an installation vessel is often already taken up by components to be transported, whereby it is difficult for these auxiliary devices to gain access to the load hook.

The known systems comprise of mounting sling hoists in a top portion of the crane mast. Such sling hoists are lowered onto the work deck and a load hook is then rigged. A problem here is that a floating vessel is subjected to waves and swell, whereby the sling hoists have a tendency to swing wildly, which may form a problem in respect of the operability of the ship. Auxiliary cranes, forklifts or similar devices which are likewise applied have the drawback that they take up a lot of space on the work deck.

SUMMARY OF THE INVENTION

An object of the present invention is therefore to provide a hoisting block for a crane with which the above stated drawbacks can be at least partially obviated.

According to the invention, a hoisting block is provided for this purpose. The hoisting block comprises an engaging element such as a load hook, to which a lifting tool such as a sling or a hoisting frame can be coupled, wherein the hoisting block further comprises at least one winch, an outgoing winch cable of which is configured to carry the lifting tool to the engaging element and couple it to the engaging element.

An embodiment of the device according to the invention is characterized in that a free outer end of the outgoing winch cable is provided with a coupling means for the lifting tool.

Another embodiment comprises a hoisting block wherein a free outer end of the outgoing winch cable is provided with a coupling means for the engaging element.

Yet another embodiment relates to a hoisting block wherein the outgoing winch cable has a limited length lying between 5 and 25 m.

A further embodiment comprises a hoisting block, wherein the hoisting block comprises at least two winches.

The at least one winch can in principle be configured and driven in any manner known to the skilled person. In a practical embodiment of the invention the hoisting block comprises at least one drive, particularly an electric drive, for driving the at least one winch.

The ease of operation is further increased in an embodiment wherein the hoisting block is provided with a drive which can be controlled remotely.

In order to increase the field of application of the hoisting block further, in an embodiment the hoisting block is characterized in that the at least one winch is configured to maintain a constant tension in the outgoing winch cable.

Another embodiment relates to a hoisting block wherein the at least one winch is configured to damp movements between the at least one winch and the connected outer end of the outgoing winch cable.

A versatile solution is provided by an embodiment of the hoisting block wherein the at least one winch is connected releasably to the hoisting block.

The invented hoisting block can advantageously be connected to the hoisting cables of a lifting crane in known manner With a lifting crane provided with the invented hoisting block any structure can in principle be taken up, wherein the above outlined advantages may occur at least partially.

Any type of crane can in principle be provided with the hoisting block according to the invention. The advantages of the hoisting block however become particularly manifest when the hoisting block is connected to the hoisting cables of a lattice boom crane. Such a crane uses a boom rotatable around a horizontal rotation axis, wherein the crane itself can generally also be rotated around a vertical rotation axis provided by a crane base.

Another aspect of the invention relates to a method for carrying a lifting tool to an engaging element and coupling it to load-bearing means. In the invented method a crane with a hoisting block according to the invention is provided, wherein an outgoing winch cable of the hoisting block is coupled to the lifting tool and the outgoing winch cable is then drawn in with the at least one winch in order to carry the lifting tool to the load-bearing means and couple it to the load-bearing means. An embodiment wherein the advantages of the method become particularly manifest is characterized in that the support structure comprises a work deck of a vessel.

Yet another aspect of the invention comprises a method for stabilizing an engaging element relative to a support structure, wherein a crane with a hoisting block according to the foregoing disclosures is provided on the support structure, wherein an outgoing winch cable of the hoisting block is coupled to the support structure, and the outgoing winch cable is then drawn in and pulled tight with the at least one winch in order to connect the hoisting block to the support structure under tension.

In a preferred embodiment of the above stated methods the outgoing winch cable is held under a constant tension.

Yet another embodiment relates to a method wherein at least two, and preferably at least four, winches are applied.

The method can in principle be applied for keeping control of structures suspended from the hoisting block and/or for coupling lifting tools to any support structure suitable for this purpose. An embodiment wherein the advantages of the method become particularly manifest is characterized in that the support structure comprises a work deck of a floating vessel.

The invented hoisting block is also advantageously applied in an embodiment of the method wherein the lifting tool is configured to lift a wind turbine or components thereof. According to an embodiment, the method comprises for this purpose of lifting a wind turbine or components thereof by a lifting tool. In addition, the hoisting block is also suitable for other applications, for instance in the context of oil and gas platform installations, or removal (decommissioning) of such platforms.

The embodiments of the invention described in this patent application can be combined in any possible combination of these embodiments, and each embodiment can individually form the subject-matter of a divisional patent application.

BRIEF DESCRIPTION OF THE DRAWINGS

The invention will now be elucidated with reference to the following figures, without otherwise being limited thereto. In the figures.

DETAILED DESCRIPTION OF THE INVENTION

Figure 1:
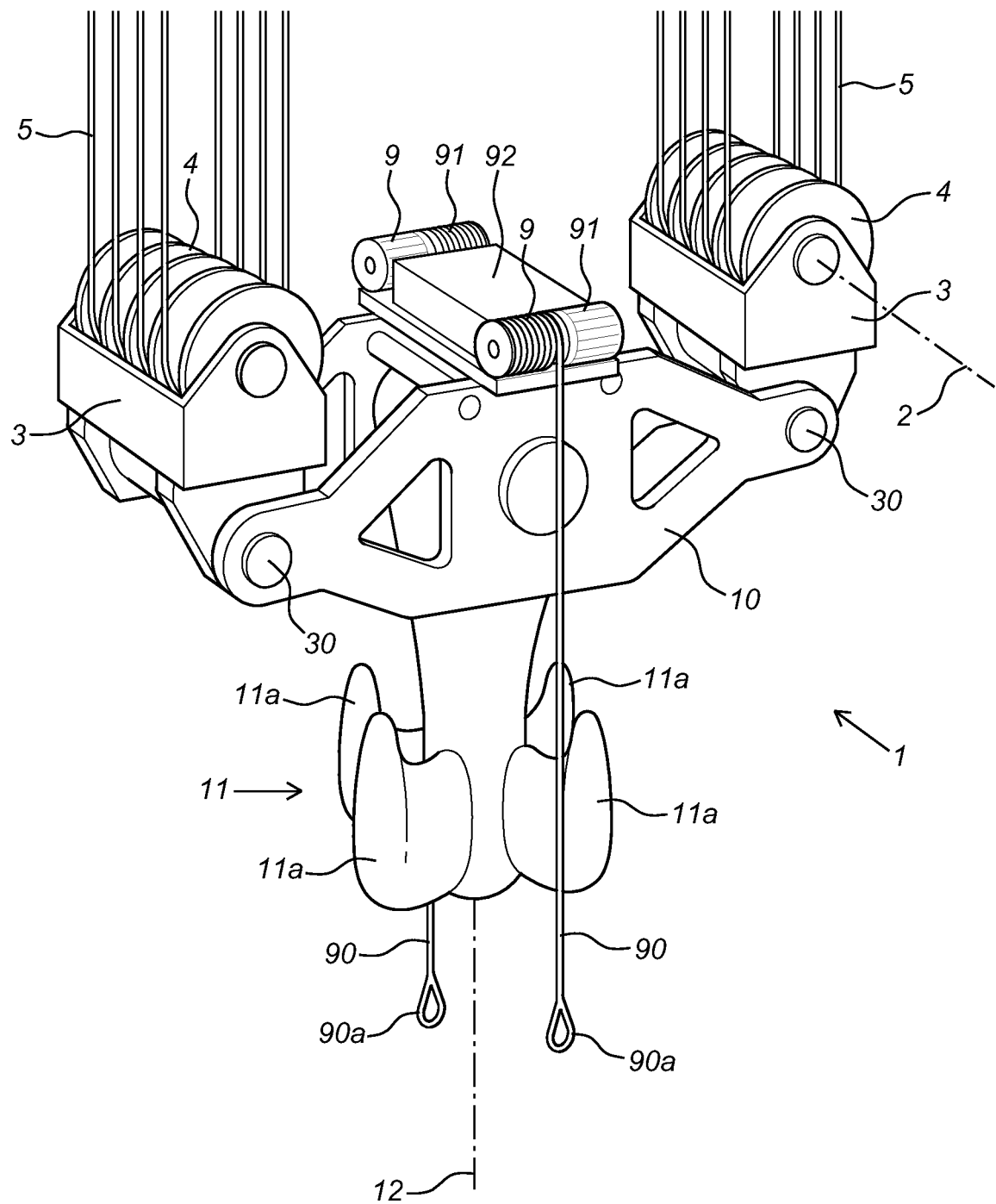
FIG. 1 is a schematic perspective view of a hoisting block according to an embodiment of the invention.

Referring to FIG. 1, a hoisting block 1 is shown according to an embodiment of the invention. Hoisting block 1 comprises two supports 3 placed at a distance from each other, in which are received pulleys 4 rotatable around a horizontal rotation axis 2. Pulleys 4 are suspended in a number of hoisting cables 5 which lead to the boom 60 of a lifting crane 6 shown in FIGS. 3 and 4. If desired, a hoisting cable 5 of the crane can be placed into the pulleys 4 of hoisting block 1 multiple times. The lifting crane can be embodied as a crane with multiple hoisting cable action. Lifting crane 6 is connected to a base 61, which is situated on the work deck 80 of a vessel 8, for rotation around a vertical axis 7. Boom 60 can be rotated around a horizontal rotation axis 62 of base 61 in known manner by tightening or paying out the luff cables 63.

Supports 3 are connected by means of rotation shafts 30 to a central carrier 10 on which an engaging element in the form of a load hook 11 is arranged on an underside. If desired, load hook 11 can be connected to carrier 10 for rotation around a vertical axis 12 (in freely suspended state). A lifting tool such as a sling 13 (see FIG. 2) or a hoisting frame can be coupled to load hook 11. Load hook 11 can for this purpose be provided with four upright hooks 11a, as shown in FIG. 1.

According to the shown embodiment of the invention, hoisting block 1 further comprises two winches 9, each with an outgoing winch cable 90. Winches 9 are driven with an electric motor 91 which, just as winches 9, is attached on an upper side to carrier 10. Optional auxiliary equipment, such as a voltage source or a remote control, is received in a housing 92. In addition to the electric motor, the drive can further also comprise a battery for the electric motor, a fuel tank, a hydraulic tank and/or a control device for the motor and hydraulic conduits. Winches 9 and, if desired, also the auxiliary equipment are optionally releasably connected to the carrier 10 of hoisting block 1 so that they can be arranged on another hoisting block in simple manner.

The outgoing winch cables 90 extend downward along both sides of carrier 10, although this is not essential. Each outgoing winch cable 90 comprises at a free outer end a fastening hook 90a for coupling winch cable 90 to another element, such as for instance hoisting hook 11, if desired.

Outgoing winch cables 90 can have any desired length, but for the intended object their length is generally limited to a length which, in paid out state, is similar to a greatest characteristic length of hoisting block 1, preferably at most five times as long, more preferably at most three times as long, and most preferably at most twice as long, for instance lying between 5 and 10 m.

Figure 2:
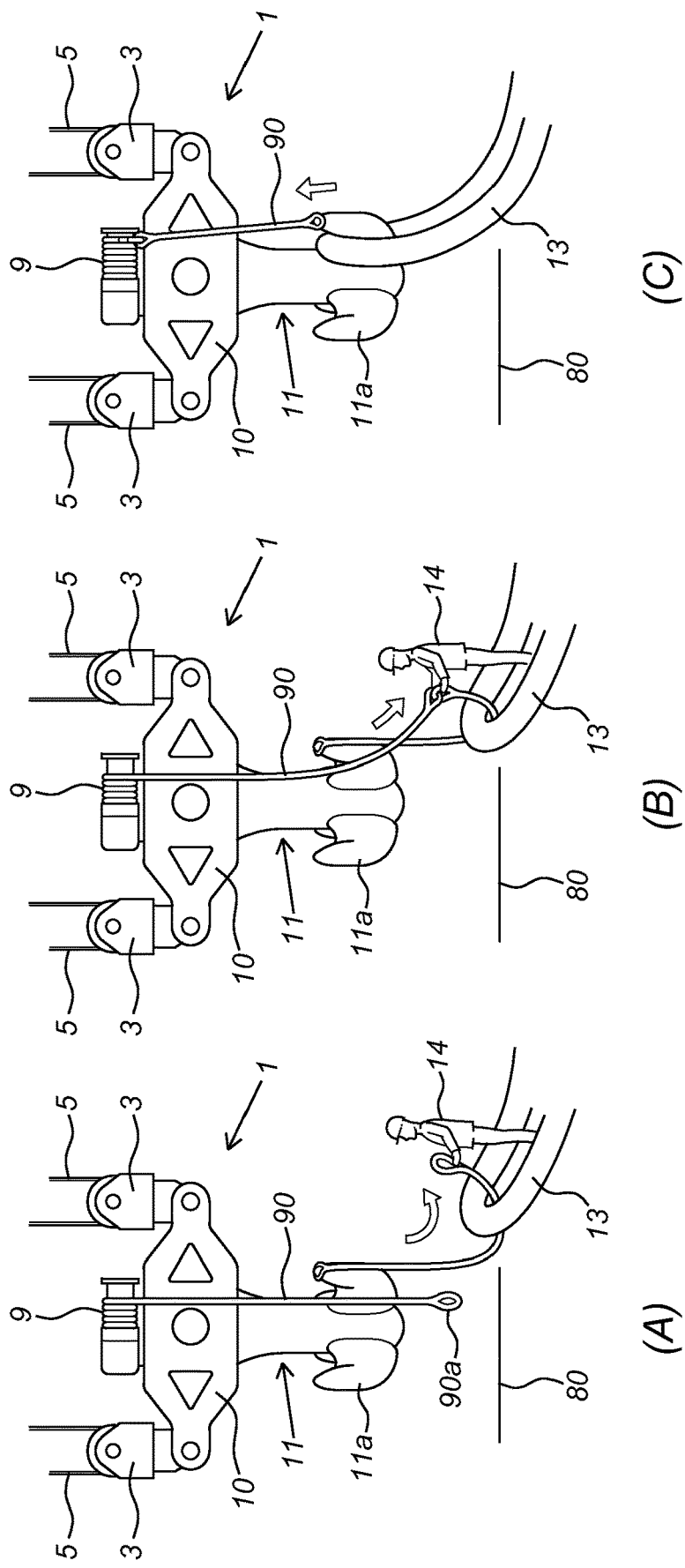
FIG. 2 is a schematic perspective view of an embodiment of a method wherein the invented hoisting block is applied.

Referring to FIG. 2, with a hoisting block 1 suspended from the hoisting cables 5 of a lifting crane 6 a lifting tool such as a sling 13 can be carried to a hoisting hook 11 and then be coupled to the hoisting hook 11 in simple manner. Sling 13 can for instance be situated on the work deck 80 of a vessel 8. A crane 6 with a hoisting block 1 is provided for this purpose. According to FIG. 2(A), a cable 100 connected to a hook 11a of load hook 11 is then pulled with its free outer end through sling 13, for instance by manpower 14, and then attached with the free outer end to a fastening eye 90a of an outgoing winch cable 90 of hoisting block 1 (FIG. 2(B)). The outgoing winch cable 90 is then taken in by winch 9, wherein the shortened winch cable 90 carries sling 13 along in the direction of load hook 11 and then couples it to a hook 11 a of load hook 11 (FIG. 2(C)).

Figure 3:
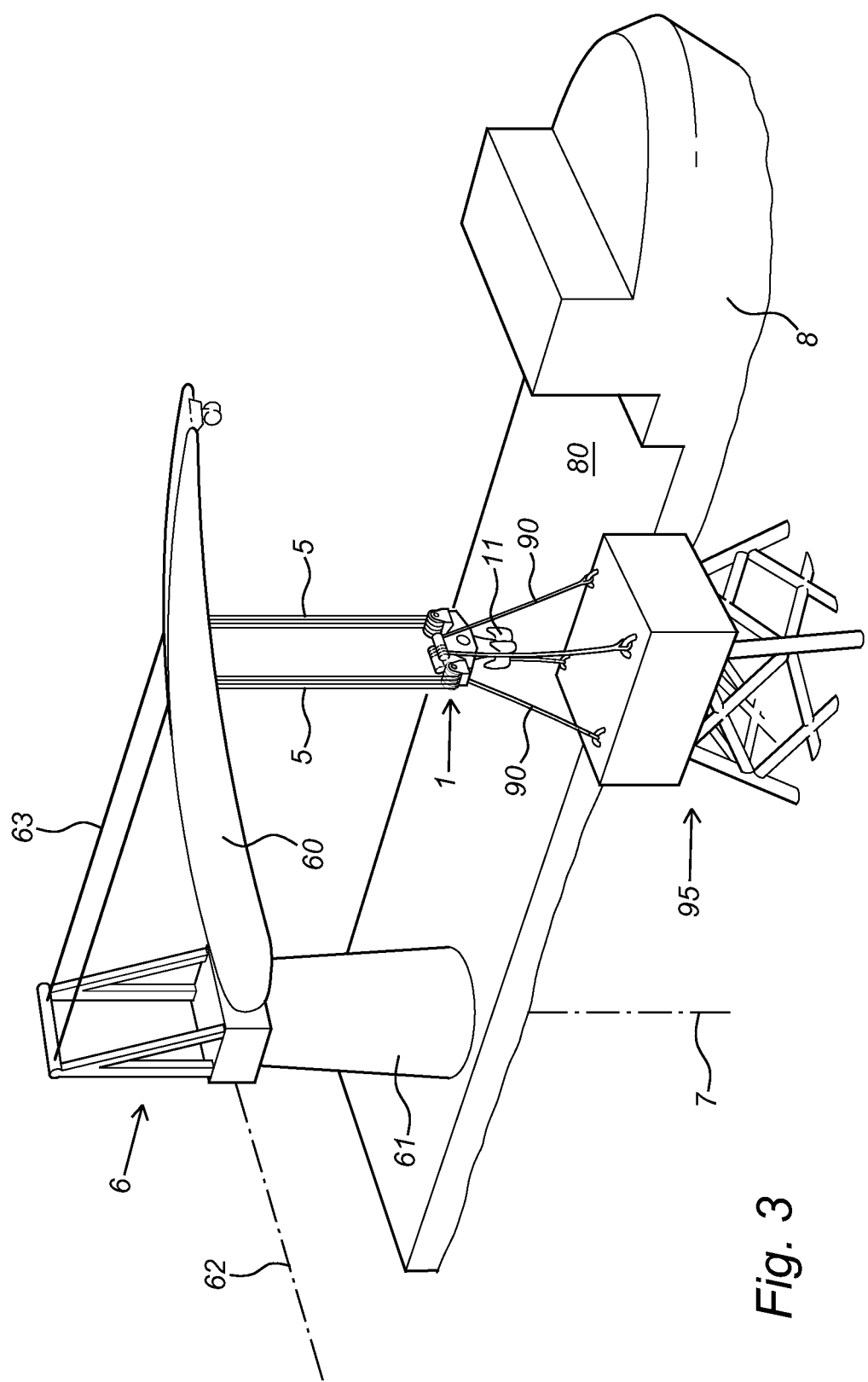
FIG. 3 is a schematic perspective view of another embodiment of a method wherein the invented hoisting block is applied.

In similar manner the load hook 11 of hoisting block 1 can be carried to a structure, such as for instance a jacket foundation 95 of a wind turbine, with winch cables 90, as shown in FIG. 3.

Figure 4:
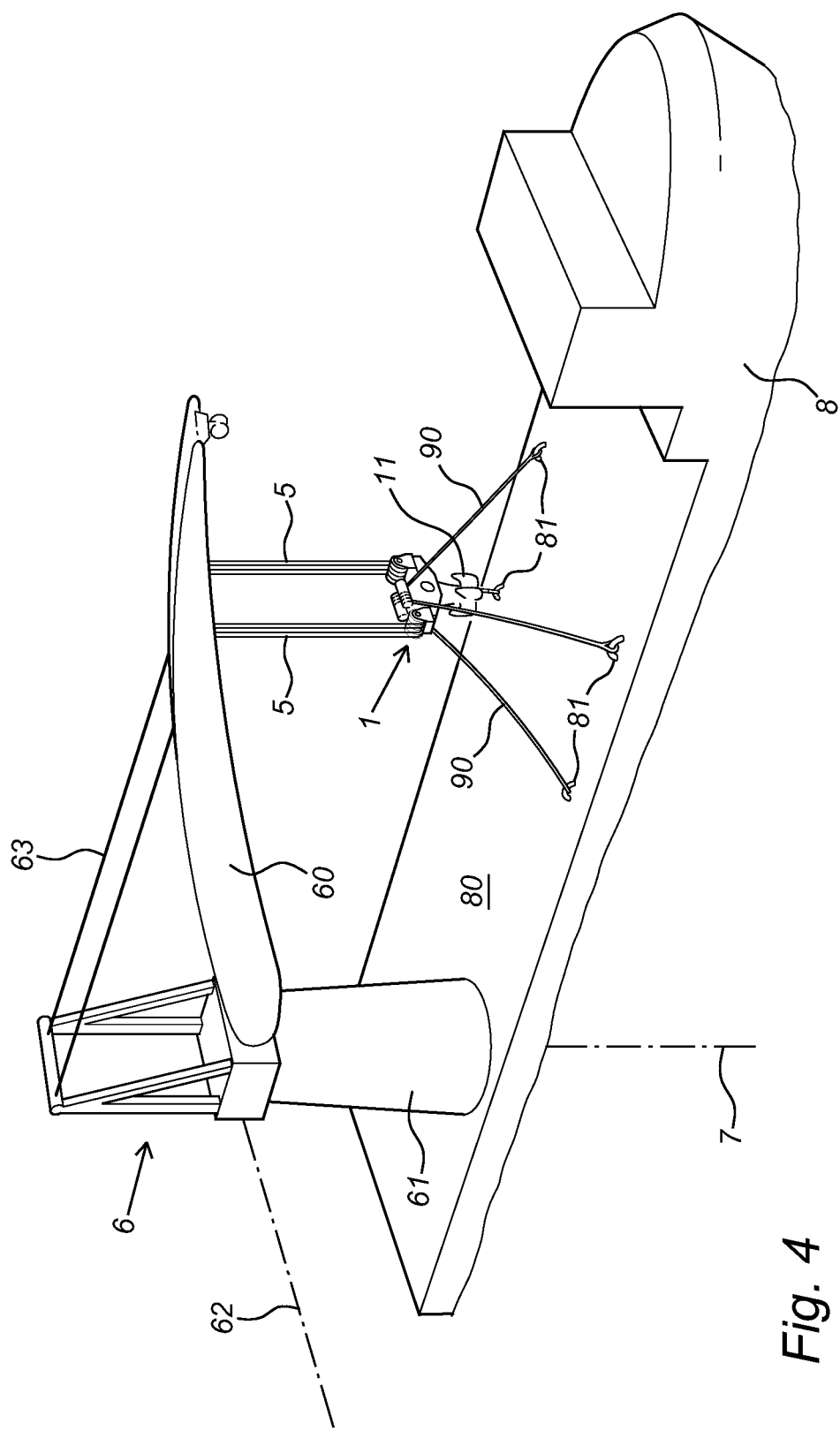
FIG. 4 is a schematic perspective view of yet another embodiment of a method wherein the invented hoisting block is applied.

Referring to FIG. 4, another application of the invented hoisting block 1 is shown. In the shown method a load hook 11 is stabilized relative to a support structure in the form of a work deck 80 of a vessel 8. A lifting crane 6 supporting on work deck 80 is provided on a boom 60 with a hoisting block 1 according to the invention. Hoisting block 1 is provided with four winches 9. Four winch cables 90 extending from winches 9 are then coupled to work deck 80, for instance with four anchoring rings 81 mounted on the work deck. Outgoing winch cables 90 are then drawn in with the four winches 9 and tightened with a preferably constant tension so as to connect hoisting block 1 to work deck 80 under tension. Hoisting block 1 and the load hook 11 connected thereto are hereby kept under control, more specifically held in a fixed position relative to work deck 80. It is advantageous here for winches 9 of hoisting block 1 to be configured to damp movements between winches 9 and anchoring rings 81. This can for instance be done by providing throttle valves in the hydraulic conduits, or in any other known manner.

It will be apparent that the above described embodiments have to be provided with peripheral equipment such as for instance hydraulic and electrical power sources, feed conduits therefor and the like. This peripheral equipment is not described in further detail.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A method for carrying a lifting tool, comprising a sling, to an engaging element and coupling it to a load-bearing means, the method comprising the steps of:
   providing a lifting crane having a hoisting block on a support structure comprising a work deck of a vessel, the hoisting block comprising:
   two supports, placed at a distance from each other, in which are received pulleys rotatable around a horizontal rotation axis, the pulleys being suspended in a plurality of hoisting cables which lead to a boom of the lifting crane, the supports being connected by means of rotation shafts to a central carrier on which an engaging element in the form of the load hook is arranged on an underside; and
   two winches, each with an outgoing winch cable, wherein the winches are driven with an electric motor which, just as the winches, is attached on an upper side to the carrier, wherein further the outgoing winch cable of each winch is configured to carry the sling of the lifting tool to the engaging element and couple it to the engaging element;
   coupling the outgoing winch cables of the hoisting block to the sling;
   drawing in the outgoing winch cable with at least one winch in order to carry the sling and couple the sling to the load-bearing means;
   coupling the outgoing winch cable of the hoisting block to the sling whereto a cable connected to a hook of the load hook is pulled with its free outer end through the sling and then attached with the free outer end to a fastening eye of the outgoing winch cable;
   drawing in the outgoing winch cable with at least one winch;
   carrying the sling along in the direction of the load hook with the shortened winch cable;
   carrying the sling in the direction of the load hook; and
   coupling the sling to a hook of the load hook.

2. The method according to claim 1, wherein the outgoing winch cable is held under a constant tension.

3. The method according to claim 2 comprising at least two winches.

4. The method according to claim 2, wherein the lifting tool is configured to lift a wind turbine or components thereof.

5. The method of claim 4 further comprising the step of lifting a wind turbine or components thereof by the lifting tool.

6. The method according to claim 2, wherein the outgoing winch cable has a limited length lying between 16 and 33 feet.

7. The method according to claim 1, comprising at least two winches.

8. The method according to claim 7 comprising at least four winches.

9. The method according to claim 7, wherein the lifting tool is configured to lift a turbine or components thereof.

10. The method according to claim 9 further comprising the step of lifting a wind turbine or components thereof by the lifting tool.

11. The method according to claim 7, wherein the outgoing winch cable has a limited length lying between 16 and 33 feet.

12. The method according to claim 1, wherein the lifting tool is configured to lift a wind turbine or components thereof.

13. The method according to claim 12, further comprising the step of lifting a wind turbine or components thereof by the lifting tool.

14. The method according to claim 1, wherein the outgoing winch cable has a limited length lying between 16 and 33 feet.

15. The method according to claim 1, wherein the hoisting block comprises at least one drive, for driving at least one winch.

16. The method according to claim 15, wherein the at least one drive is controlled remotely.

17. The method according to claim 15, wherein the at least one drive is an electric drive.

18. The method according to claim 17 comprising at least four winches.

19. The method according to claim 1, wherein at least one winch damps movements between at least one winch and the connected outer end of the outgoing winch cable.

20. The method according to claim 1, wherein at least one winch is connected releasably to the hoisting block.

* * * * *